(12) United States Patent
Chen

(10) Patent No.: US 11,270,627 B2
(45) Date of Patent: Mar. 8, 2022

(54) METHOD FOR ACQUIRING AND TRANSMITTING COMPENSATION DATA, AND INTELLIGENT TERMINAL

(71) Applicant: Kunshan Go-Visionox Opto-Electronics Co., Ltd., Kunshan (CN)

(72) Inventor: Feng Chen, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 23 days.

(21) Appl. No.: 16/739,136

(22) Filed: Jan. 10, 2020

(65) Prior Publication Data

US 2020/0152116 A1    May 14, 2020

Related U.S. Application Data

(63) Continuation of application No. PCT/CN2019/085299, filed on Apr. 30, 2019.

(30) Foreign Application Priority Data

Jul. 25, 2018 (CN) .......................... 201810824396.X

(51) Int. Cl.
  *G09G 3/22* (2006.01)
  *G09G 3/20* (2006.01)
  *H04L 67/06* (2022.01)

(52) U.S. Cl.
  CPC ............. *G09G 3/22* (2013.01); *G09G 3/2092* (2013.01); *H04L 67/06* (2013.01);
  (Continued)

(58) Field of Classification Search
  CPC ................ G09G 3/22; G09G 3/2092; G09G 2320/0233; G09G 2320/0686; G09G 2330/10; G09G 2370/16; H04L 67/06
  See application file for complete search history.

(56) References Cited

U.S. PATENT DOCUMENTS

| 10,249,264 | B2 | 4/2019 | Hu et al. |
| 2009/0135211 | A1* | 5/2009 | Wang ........................ G09G 3/20 345/690 |

(Continued)

FOREIGN PATENT DOCUMENTS

| CN | 104992657 A | 10/2015 |
| CN | 107977182 A | 5/2018 |

(Continued)

*Primary Examiner* — Carolyn R Edwards
*Assistant Examiner* — Eboni N Giles
(74) *Attorney, Agent, or Firm* — Kilpatrick Townsend & Stockton

(57) ABSTRACT

The present disclosure relates to a method acquiring and transmitting compensation data and an intelligent terminal. The method for acquiring and transmitting the compensation data includes: respectively encoding a screen body module and compensation data to obtain a first identifier corresponding to the screen body module and a second identifier corresponding to the compensation data, and the second identifier corresponding to the first identifier; identifying the first identifier of the screen body module; acquiring the compensation data that has the corresponding second identifier according to the first identifier; storing the compensation data in a data driving circuit.

10 Claims, 5 Drawing Sheets

(52) U.S. Cl.
CPC ............... *G09G 2320/0233* (2013.01); *G09G 2320/0686* (2013.01); *G09G 2330/10* (2013.01); *G09G 2370/16* (2013.01)

(56) References Cited

U.S. PATENT DOCUMENTS

| | | | |
|---|---|---|---|
| 2017/0243562 A1* | 8/2017 | Hu | G09G 5/10 |
| 2018/0343429 A1* | 11/2018 | Kim | G09G 3/20 |
| 2019/0043430 A1* | 2/2019 | Jung | G09G 3/3233 |
| 2019/0244566 A1* | 8/2019 | Kim | G09G 3/3225 |

FOREIGN PATENT DOCUMENTS

| | | |
|---|---|---|
| CN | 108172183 A | 6/2018 |
| CN | 108898991 A | 11/2018 |
| WO | 2019134465 A1 | 7/2019 |

\* cited by examiner

METHOD FOR ACQUIRING AND TRANSMITTING COMPENSATION DATA, AND INTELLIGENT TERMINAL

CROSS-REFERENCES TO RELATED APPLICATIONS

This application is a continuation application of International Application PCT/CN2019/085299, filed on Apr. 30, 2019, which claims priority to Chinese Patent Application No. 201810824396. X, filed on Jul. 25, 2018, entitled "Method for Acquiring and Transmitting Compensation Data, and Intelligent Terminal", the contents of these applications are incorporated herein by reference in its entirety.

TECHNICAL FIELD

The present disclosure relates to the display technology.

BACKGROUND

At present, Active Matrix Driving OLED (AMOLED) is widely used due to simultaneously having advantages of self-illumination, high display contrast, thin in depth, wide viewing angle, fast reaction, wide range of temperature, simple construction and process and the like.

SUMMARY

Exemplary embodiments disclosed in the present disclosure provide a method for acquiring and transmitting compensation data, and an intelligent terminal.

As an aspect of the present disclosure, a method for acquiring and transmitting compensation data is provided, which is applied to implement acquisition and transmission of compensation data of a display panel, and the display panel includes: a screen body module, configured to implement pixel display; a data driving circuit, electrically connected to the screen body module and configured to store the compensation data, the compensation data being configured to compensate the Mura phenomenon of the screen body module.

The method includes: respectively encoding the screen body module and the compensation data to obtain a first identifier corresponding to the screen body module and a second identifier corresponding to the compensation data, and the second identifier corresponding to the first identifier; identifying the first identifier of the screen body module; acquiring the compensation data with the corresponding second identifier according to the first identifier; storing the compensation data in the data driving circuit of the display panel.

In an embodiment, before the respectively encoding the screen body module and the compensation data, the method further includes: lighting up the screen body module through the data driving circuit, and making the screen body module display gray-scale pictures of different orders; acquiring image information of the screen body module under the gray-scale pictures of different orders; processing the image information through a Mura compensation algorithm to obtain the compensation data corresponding to the screen body module.

In an embodiment, after the obtaining the compensation data corresponding to the screen body module, the method further includes: loading the compensation data into the data driving circuit of the display panel, performing, by the data driving circuit, data compensation for the screen body module according to the loaded compensation data, if the Mura phenomenon of the screen body module is not eliminated, returning to the step of acquiring image information of the screen body module under the gray-scale pictures of different orders.

In an embodiment, after respectively encoding the screen body module and the compensation data, the method further includes: storing the encoded compensation data into a cloud.

In an embodiment, the storing the compensation data in the data driving circuit of the display panel further includes: downloading the compensation data corresponding to the second identifier from the cloud; determining whether the compensation data corresponding to the second identifier is successfully downloaded.

In an embodiment, the data driving circuit is further electrically connected to the NAND-Flash memory, and the determining whether the compensation data corresponding to the second identifier is successfully downloaded further includes: if the download is successful, storing the compensation data corresponding to the second identifier into the NAND-Flash memory.

In an embodiment, the determining whether the compensation data corresponding to the second identifier is successfully downloaded further includes: if the download is not successful, returning to the step of downloading the compensation data corresponding to the second identifier from the cloud.

In an embodiment, if the step of downloading the compensation data corresponding to the second identifier from the cloud is performed more than three times, the download is stopped.

In an embodiment, the storing the compensation data in the data driving circuit of the display panel further includes: initializing the screen body module; loading the compensation data corresponding to the second identifier stored in the NAND-Flash memory to the data driving circuit, and verifying whether the compensation data corresponding to the second identifier is loaded correctly.

In one embodiment, the step of verifying whether the compensation data corresponding to the second identifier is loaded correctly further includes: if the compensation data corresponding to the second identifier being loaded correctly, the data driving circuit turning on the Mura compensation mode and performing data compensation for the display panel.

In an embodiment, the verifying whether the compensation data corresponding to the second identifier is loaded correctly further includes: if the compensation data corresponding to the second identifier is loaded incorrectly, returning to the step of loading the compensation data corresponding to the second identifier stored in the NAND-Flash memory to the data driving circuit, and verifying whether the compensation data corresponding to the second identifier is loaded correctly.

In one embodiment, the verifying whether the compensation data corresponding to the second identifier is loaded correctly further includes: if a number of incorrect loading of the compensation data corresponding to the second identifier is more than three times, the data driving circuit does not start the Mura compensation mode, and the display panel directly performs display without data compensation.

As another aspect of the present application, an intelligent terminal is provided, including: a display panel, including: a screen body module, configured to implement pixel display; a data driving circuit, electrically connected to the screen body module and configured to store compensation data, the compensation data is configured to compensate a Mura phenomenon of the screen body module; and a NAND-Flash memory, electrically connected to the display panel and configured to store operational data of the intelligent terminal.

The present disclosure relates to a method for acquiring and transmitting compensation data, and an intelligent terminal. A display panel includes a screen body module and a data driving circuit. The screen body module is electrically connected to the data driving circuit. The method includes: the screen body module and the compensation data are respectively encoded to obtain a first identifier corresponding to the screen body module and a second identifier corresponding to the compensation data, and the second identifier corresponds to the first identifier; the first identifier of the screen body module is identified; compensation data with the corresponding second identifier is acquired according to the first identifier; the compensation data is stored into the data driving circuit of the display panel. In the method, a one-to-one corresponding relationship is set between the identifier of the screen body module and the identifier of the compensation data. Through looking for compensation data with the same or corresponding identifier as the screen body module, the found compensation data is stored and the data compensation for the display panel is completed through the data driving circuit. In the method adopted by the present disclosure, through setting the one-to-one corresponding relationship between the identifier of the screen body module and the identifier of the compensation data, there is no need to arrange the Flash memory in the display panel, thereby reducing the design cost of the display panel. Meanwhile, the transmission path of the compensation data in the present disclosure is simple, and thus the transmission efficiency and transmission accuracy of the compensation data are improved.

DETAILED DESCRIPTION OF THE INVENTION

The current of the organic light emitting diode varies with the threshold voltage deviation of the driving transistor, such that the AMOLED display panel produces a non-uniform display brightness Mura (spot defect) phenomenon. The Mura phenomenon refers to the fact that the actual brightness of a part of the pixels is darker or brighter than the theoretical brightness that should be displayed, thereby affecting the brightness uniformity and brightness constancy of the AMOLED display panel.

The present disclosure will be further detailed below with reference to the accompanying drawings and exemplary embodiments, in order to make the objectives, technical solutions and advantages of the present disclosure clearer. It should be understood that the specific embodiments described herein are merely used for explaining the present disclosure and not intended to limit the present disclosure.

When the compensation is performed for the Mura phenomenon of a display panel, the processed compensation data is usually written into a RAM of a data driving circuit of the display panel all at once, and the compensation data is stored into the Flash ROM of the display panel from the RAM. Accordingly, it is necessary to dispose a Flash memory in the display panel in the process of compensation for the Mura phenomenon. In this way, the design cost of the display panel is increased, and the transmission process of the compensation data is made more complicated, the transmission verification is prone to error, and the transmission efficiency is lower. A method for acquiring and transmitting compensation data provided by an exemplary embodiment of the present disclosure is applied to implement the acquisition and transmission of the compensation data of the display panel and verification in the process.

Figure 5:
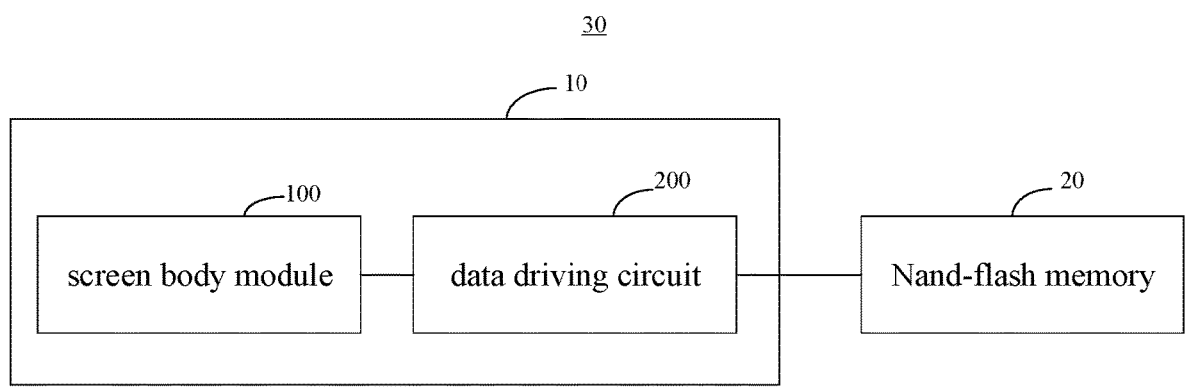
FIG. 5 is a schematic structural diagram of an intelligent terminal provided by an exemplary embodiment of the present disclosure.

Referring to FIG. 5, a display panel 10 may include a screen body module 100 and a data driving circuit 200. The screen body module 100 is electrically connected to the data driving circuit 200. The screen body module 100 includes a substrate and an array pixel unit arranged on a surface of the substrate. The data driving circuit 200 is configured to transmit various data to the screen body module 100. For example, control information of the pixel unit can be transmitted.

In an exemplary embodiment of the present disclosure, a method for acquiring and transmitting compensation data at least includes the following steps.

Step S090: the screen body module 100 and the compensation data are respectively encoded to obtain a first identifier corresponding to the screen body module 100 and a second identifier corresponding to the compensation data, and the second identifier corresponds to the first identifier. In the present step, the first identifier may be an ID code set according to a characteristic parameter of the screen body module 100. The first identifier of the screen body module 100 may be obtained in different modes, for example, the first identifier may be a characteristic parameter of the display panel 10 (the characteristic parameter may be a size, a dimension, a model number, or a production time of a product). In the process of storing the compensation data, a one-to-one corresponding relationship may be established between each screen body module 100 and the compensation data. In the present disclosure, the term "corresponding" means the same or associated, in other words, the first identifier may be the same as or associated with the second identifier.

Step S100: the first identifier of the screen body module 100 is identified. In the present step, the first identifier may be identified in different modes, for example, the first identifier may be identified by identifying the label information (such as a two-dimensional code) on the screen body module 100 or on the display panel, or the first identifier may be further determined after identifying the characteristic parameter (such as a model number, a production time) of the screen body module 100. The method for identifying the first identifier of the screen body module 100 is not specifically limited in the present disclosure.

Step S200: the compensation data with the corresponding second identifier is acquired according to the first identifier;

Since there is a corresponding relationship between each screen body module 100 and the compensation data, when it is required to perform compensation for the display panel 10, the compensation data with the second identifier is looked for. Here, the second identifier may be the same as the first identifier or may be associated with the first identifier. Specifically, the second identifier of the compensation data may be looked for and compared according to the first identifier established previously. For example, the first identifier of one screen body module 100 may be set as an ID code: screen 110, and the ID code (screen 110) is stored in the data storage unit of the display panel 10. The second identifier of the compensation data may be set accordingly as an ID code: screen-data 110. The ID code (screen-data 110) of the compensation data may be stored in an external computer, a cloud storage, or a storage unit of the intelligent terminal.

Step S300: the compensation data is stored in the data driving circuit 200 of the display panel 10.

In the present step, when it is required to perform data compensate for the display panel 10, the compensation data with the second identifier found in Step S200 is stored in the display panel 10, specifically, stored in the data storage unit of the data driving circuit 200. The data compensation for the screen body module 100 is implemented through the data driving of the data driving circuit 200.

In the present embodiment, the display panel 10 includes the screen body module 100 and the data driving circuit 200. The screen body module 100 is electrically connected to the data driving circuit 200. The method includes: the screen body module 100 and the compensation data are encoded respectively to obtain a first identifier corresponding to the screen body module 100 and a second identifier corresponding to the compensation data, and the second identifier corresponding to the first identifier; the first identifier of the screen body module 100 is identified; the corresponding second identifier is acquired according to the first identifier; corresponding compensation data is acquired according to the second identifier; the compensation data is stored in the data driving circuit 200 of the display panel 10 to implement the data compensation for the screen body module 100 of the display panel 10. In the above-mentioned method, a one-to-one corresponding relationship between the identifier of the screen body module 100 and the identifier of the compensation data is set. Through looking for the compensation data with an identifier which is the same as or corresponds to an identifier of the screen body module 100, the found compensation data is stored and the data compensation for the display panel 10 is completed through the data driving circuit 200. In the method adopted by the present embodiment, through setting the one-to-one corresponding relationship between the identifier of the screen body module 100 and the identifier of the compensation data, there is no need to arrange a Flash memory in the display panel 10, thereby reducing the design cost of the display panel 10. Meanwhile, the transmission path of the compensation data in the present embodiment is simple, and thus the transmission efficiency and transmission accuracy of the compensation data are improved.

Figure 1:
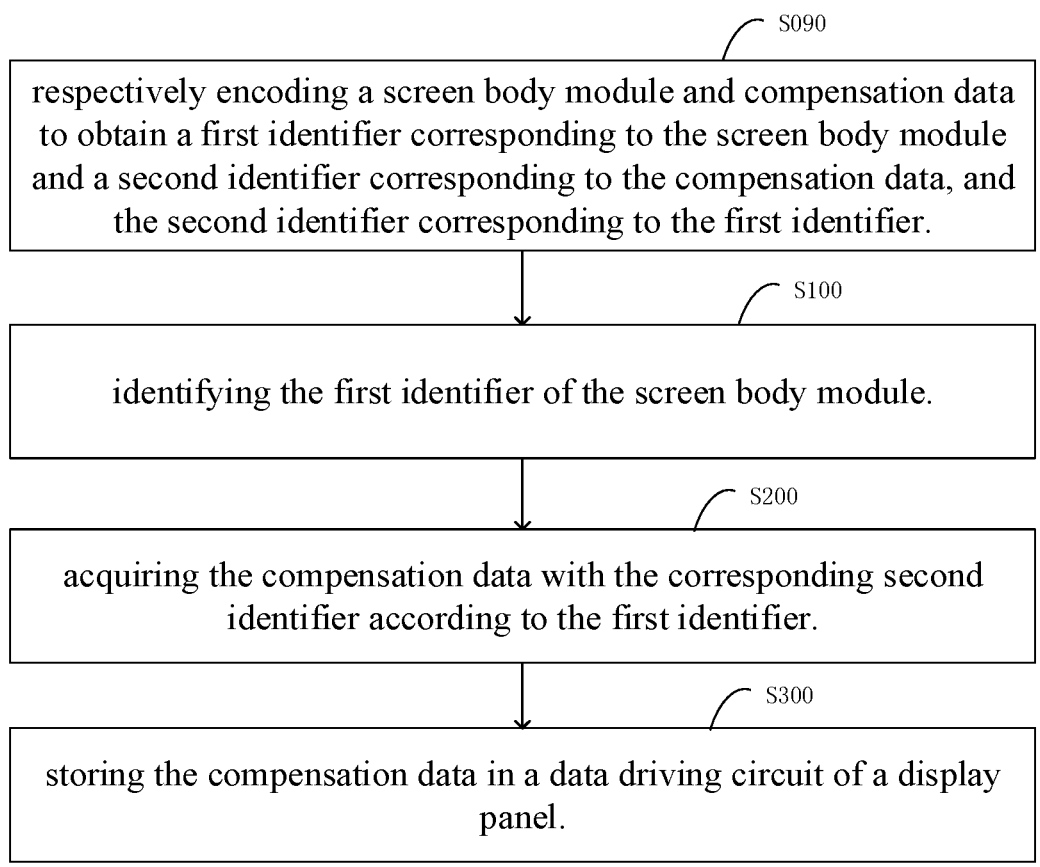
FIG. 1 is a schematic flowchart of a method for acquiring and transmitting compensation data provided by an exemplary embodiment of the present disclosure.
Figure 2:
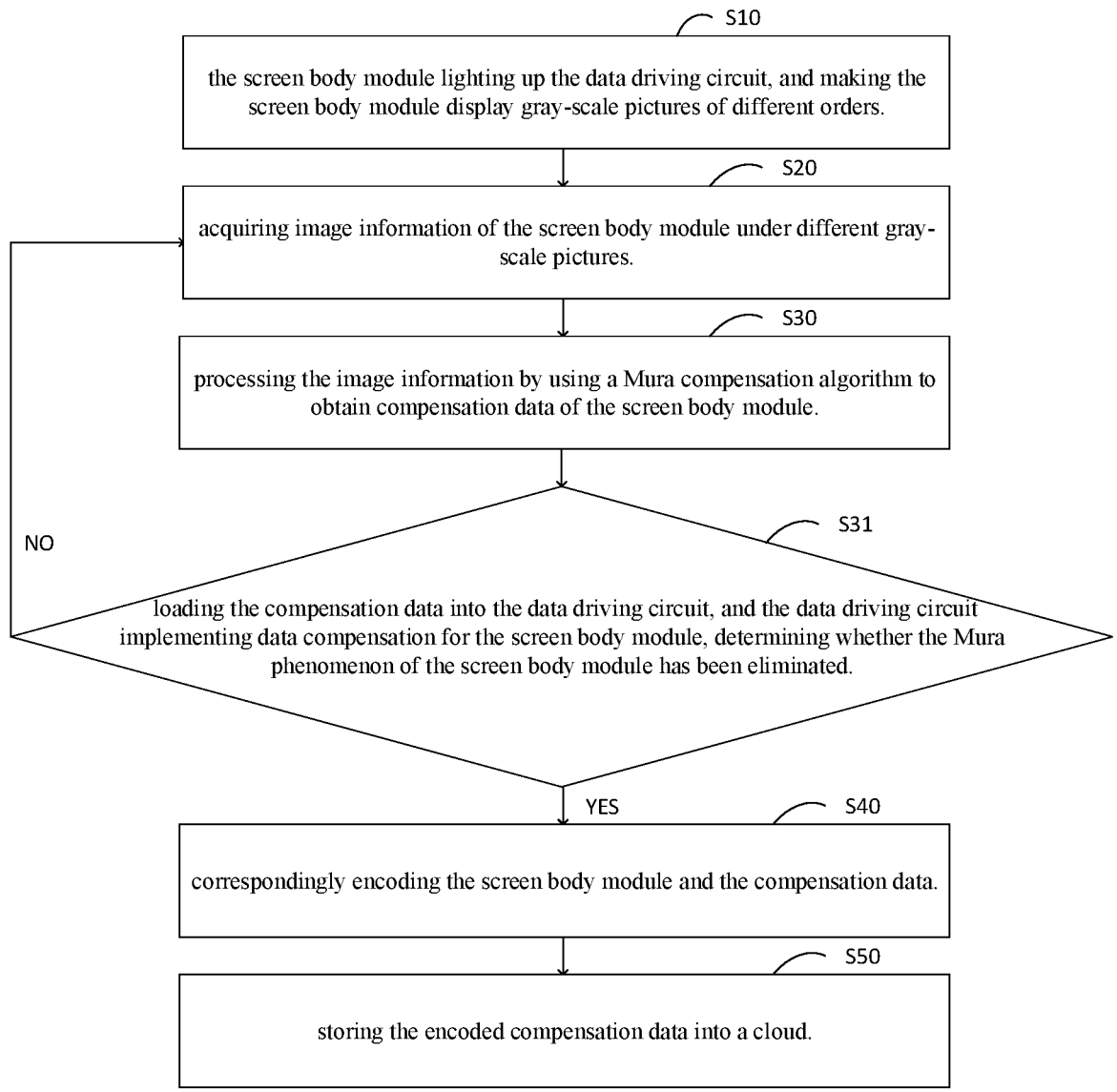
FIG. 2 is a partial schematic flowchart of a method for acquiring and transmitting compensation data provided by an exemplary embodiment of the present disclosure.

Referring to FIG. 2, in one embodiment, before the step of identifying the first identifier of the screen body module 100, the method may further include the following steps S10-S40.

Step S10: the data driving circuit 200 lights up the screen body module 100, and makes the screen body module 100 display gray-scale pictures of different orders (hereinafter simply as different gray-scale pictures). In the present step, the data driving circuit 200 may apply different driving signals to the screen body module 100, to make the screen body module 100 display different gray-scale pictures. It could be possible to effectively find the part of the screen body module 100 which needs compensation (may be some pixel units needing compensation) through displaying different gray-scale pictures.

Step S20: image information the screen body module 100 under different gray-scale pictures is acquired. In the present step, different gray-scale pictures of the screen body module 100 may be acquired through a high-precision camera. That is, in step S10, the data driving circuit 200 applies a driving signal to the screen body module 100, and the high-precision camera acquires the image information under a gray-scale picture. When the data driving circuit 200 changes the driving signal many times, the high-precision camera acquires the image information many times. Finally, image information of the screen body module 100 under different gray-scale pictures is acquired.

Step S30: the image information is processed by using a Mura compensation algorithm to obtain compensation data of the screen body module 100. In the present step, various methods may be used to process the acquired image information, for example, a Mura compensation algorithm may be used. Specifically, there may be multiple Mura compensation algorithms, and different Mura compensation algorithms may be used for image information of different gray-scale pictures.

Step S40: the screen body module 100 and the compensation data are encoded in a corresponding mode. In the present step, the screen body module 100 is encoded to obtain a first identifier. The same or corresponding encoding is performed on the calculated compensation data of the screen body module 100 to obtain a second identifier. The screen body module 100 and the compensation data are encoded in a one-to-one corresponding mode, to enable the screen body module 100 and the compensation data to be identified in the one-to-one corresponding mode in the subsequent steps.

The present embodiment provides a method of how to encode the screen body module 100 and the compensation data. The encoding method provided in the present embodiment is simple and effective. In the present disclosure, other methods may also be used to obtain the encoding information corresponding to the screen body module 100 and the compensation data, which is not limited to the steps in the present embodiment.

In an embodiment, before the step of encoding the screen body module 100 and the compensation data in the one-to-one corresponding mode, the method may further include a step S31.

Step S31: the compensation data is loaded into the data driving circuit 200, and the data driving circuit 200 implements the data compensation for the screen body module 100. If the Mura phenomenon of the screen body module 100 is not eliminated, the process returns to the step of acquiring image information of the screen body module 100 under different gray-scale pictures.

The present embodiment provides an action that should be further implemented if the Mura phenomenon of the screen body module 100 is not eliminated. The addition of step S31 makes the method more complete, and avoids the phenomenon that the acquired compensation data cannot implement the compensation for the screen body module 100, such that the acquired compensation data is more accurate, and the method for acquiring and transmitting compensation data is more complete.

In an embodiment, after the step of encoding the screen body module 100 and the compensation data in the corresponding mode, the method may further include the step S50 of storing the encoded compensation data into a cloud.

In the present embodiment, the cloud may be a software platform that adopts the application program virtualization technology. The cloud can bring the software search, downloading, usage, management, back-up and other functions together. The cloud may enable various commonly used software or data to be encapsulated in an independent virtualized environment, such that the application software or data is not coupled with the system, and does not occupy the storage space of the intelligent terminal. In the present embodiment, the encoded screen body module 100 and compensation data may be stored in the cloud. When the intelligent terminal 30 needs to perform compensation on the screen body module 100, the encoded compensation data may be downloaded from the cloud.

Figure 3:
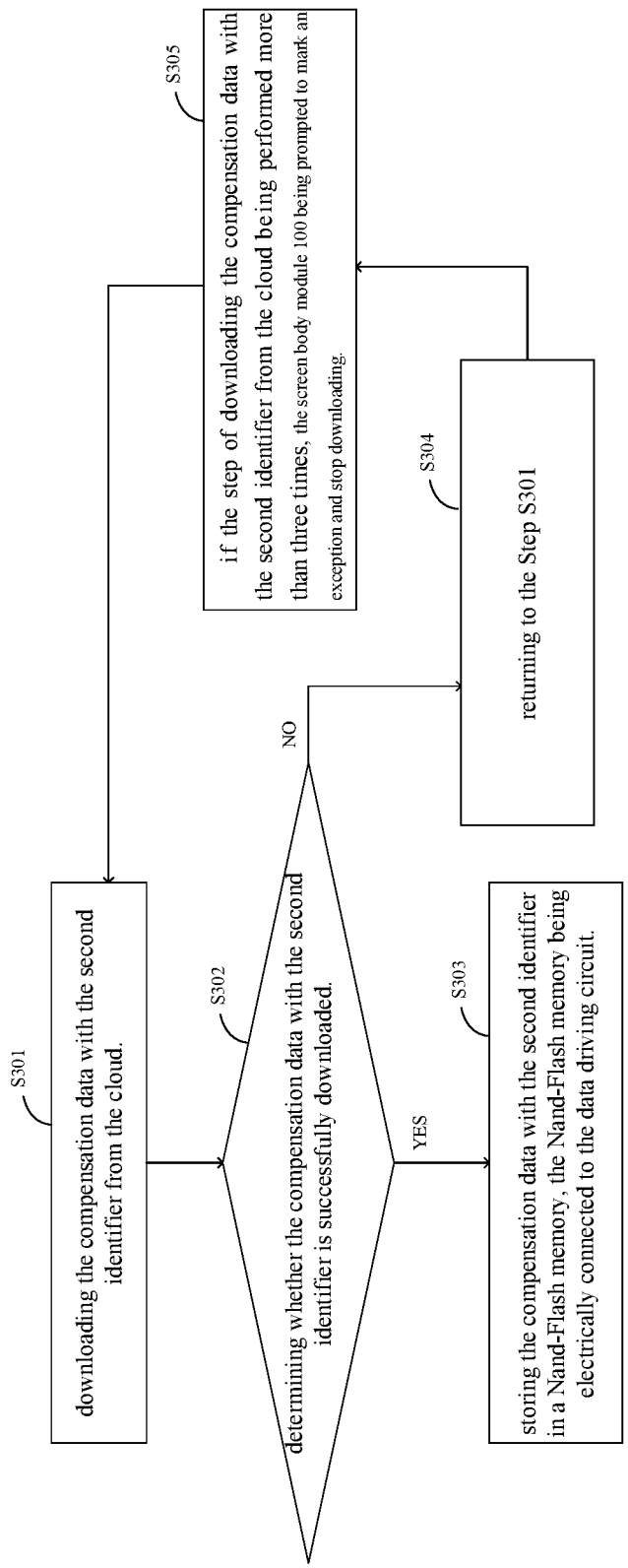
FIG. 3 is a partial schematic flowchart of a method for acquiring and transmitting compensation data provided by another exemplary embodiment of the present disclosure.

Referring to FIG. 3, in an embodiment, the step of storing the compensation data with the second identifier in the display panel 10 to implement the data compensation for the display panel 10 (i.e., step S300) includes steps S301-S304.

Step S301: the compensation data with the second identifier is downloaded from the cloud. In the present step, it may be the display panel 10 to download the compensation data with the second identifier from the cloud, or may be the intelligent terminal 30 system to download the compensation data with the second identifier from the cloud. Specifically, the specific selection can be performed according to the settings of those skilled in the art.

Step S302: it is determined whether the compensation data with the second identifier is successfully downloaded.

Step S303: if the return value of step S302 is YES, the compensation data with the second identifier is stored in the NAND-Flash memory 20. The NAND-Flash memory 20 is electrically connected to the data driving circuit 200. In the present step, it is required to determine whether the downloaded compensation data with the second identifier is correct before storing the compensation data with the second identifier. If the downloaded compensation data is correct, the compensation data is stored.

In the present step, the step of determining whether the compensation data is correct may include: a first check code of the compensation data is generated in the process of uploading to the cloud, and a second check code is generated in the process of writing the compensation data into the NAND-Flash memory 20; the first check code is compared to the second check code, if the first check code is consistent with the second check code, it indicates that the compensation data with the second identifier is downloaded correctly; and if the first check code is not consistent with the second check code, it indicates that the compensation data with the second identifier is downloaded incorrectly. Other modes may be used to determine whether they are consistent with each other.

Step S304: If the return value of step S302 is NO, the process returns to the step of downloading the compensation data with the second identifier from the cloud (i.e., step S301). In the present step, if the downloaded compensation data is incorrect, the compensation data is not stored. If the downloaded compensation data is incorrect, the process returns to the step of downloading the compensation data with the second identifier from the cloud.

In the present embodiment, the step of determining whether the compensation data is correct is added into the process of storing the compensation data with the second identifier in the display panel 10, resulting in that the compensation data can be acquired more securely, such that the compensation data acquisition and transmission solutions are safer and more reliable.

In an embodiment, the step of storing the compensation data with the second identifier in the display panel 10 to implement the data compensation for the display panel 10 may further include step S305.

Step S305: if the step of downloading the compensation data with the second identifier from the cloud is performed more than three times, the screen body module 100 is prompted to mark an exception and stop downloading.

In the present embodiment, if the step of downloading the compensation data with the second identifier from the cloud is performed more than three times, the compensation data stored in the cloud may be incorrect, or the downloaded compensation data does not correspond to the screen body module 100. If the matching of the screen body module 100 and the compensation data still cannot be achieved after three times of downloading, the screen body module 100 needs to be prompted to mark an exception and stop downloading.

Figure 4:
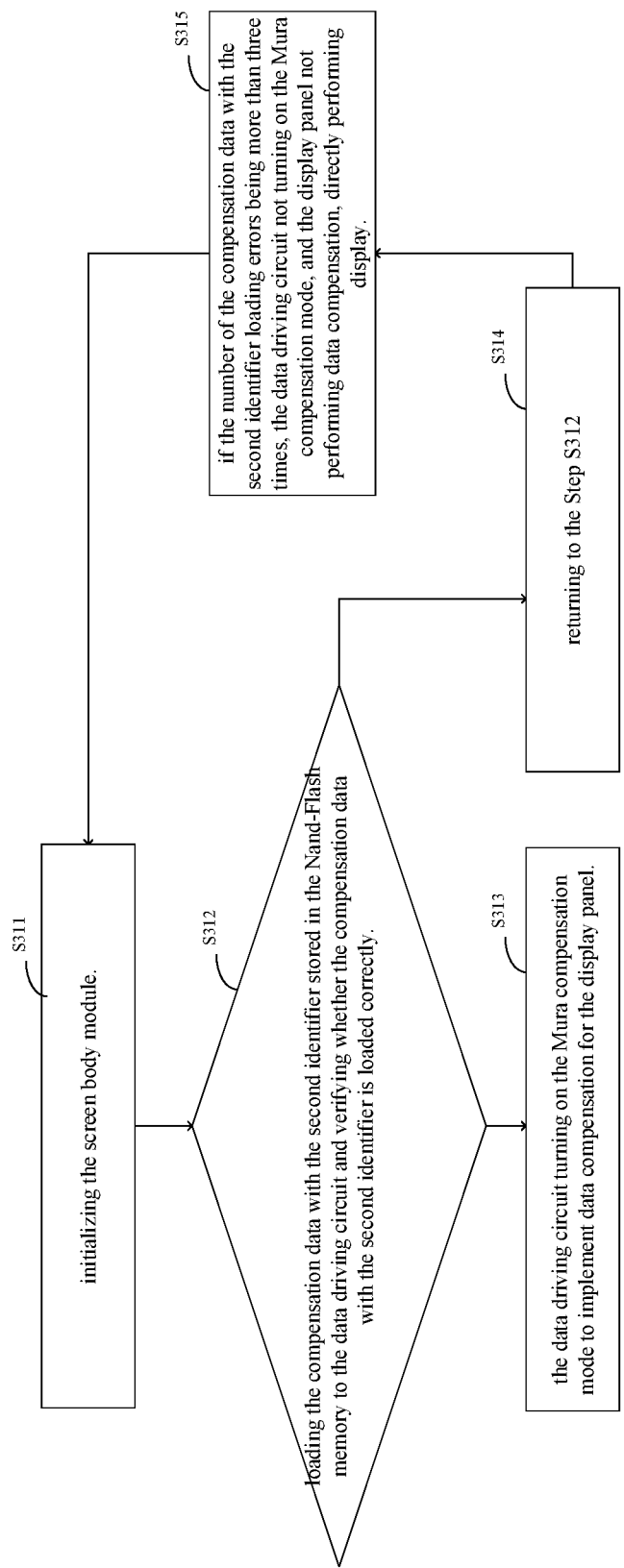
FIG. 4 is a partial schematic flowchart of a method for acquiring and transmitting compensation data provided by another exemplary embodiment of the present disclosure.

Referring to FIG. 4, in an embodiment, the step of storing the compensation data with the second identifier in the display panel 10 to implement the data compensation for the display panel 10 (i.e., step S300) may further include steps S311-S313.

Step S311: the screen body module 100 is initialized.

Step S312: the compensation data with the second identifier stored in the NAND-Flash memory 20 is loaded into the data driving circuit 200, and it is verified whether the compensation data with the second identifier is loaded correctly.

Step S313: if the compensation data with the second identifier is loaded correctly, the data driving circuit 200 turns on the Mura compensation mode to implement the data compensation for the display panel 10.

In the present embodiment, when the screen body module 100 is started for the first time or the screen body module 100 is restarted, the screen body module 100 needs to be initialized during the data compensation for the display panel 10. The NAND-Flash memory 20 verifies whether the compensation data with the second identifier is loaded correctly. The specific verification method is not limited herein, and reference may be made to the verification method of storing the compensation data in the data driving circuit 200.

In an embodiment, the step of storing the compensation data with the second identifier in the display panel 10 to implement the data compensation for the display panel 10 (i.e., Step S300) may further include step S314.

Step S314: if the compensation data with the second identifier is loaded incorrectly, the process returns to the step S312, that is, the step of loading the compensation data with the second identifier stored in the NAND-Flash memory 20 into the data driving circuit 200 and verifying whether the compensation data with the second identifier is loaded correctly.

In the present embodiment, the setting of step S314 may make the NAND-Flash memory 20 verify the compensation data with the second identifier many times, and some errors or disturbances may be eliminated through multiple verifications. Once the compensation data with the second identifier is loaded incorrectly, the compensation data continues to be stored in the NAND-Flash memory 20 and the compensation data with the second identifier is re-verified.

In an embodiment, the step of storing the compensation data with the second identifier in the display panel 10 to implement the data compensation for the display panel 10 (i.e., step S300) may further include step S315.

Step S315: if the number of incorrect loading of the compensation data with the second identifier is more than three times, the data driving circuit 200 does not start the Mura compensation mode, and the display panel 10 directly perform display without the data compensation.

In the present embodiment, the setting of a condition under which the Mura compensation mode is not started may make the data compensation for the display panel 10 more secure. If the number of incorrectly loading of the compensation data with the second identifier is more than three times, it indicates that the compensation data with the second identifier does not correspond to the screen body module 100 with the first identifier, then the data driving circuit 200 does not start the Mura compensation mode, and the data compensation is not performed for the display panel 10.

Referring to FIG. 5, in an embodiment, an intelligent terminal 30 is provided, including a display panel 10 and a NAND-flash memory 20.

In the present embodiment, the intelligent terminal 30 may be a computer, a television, a mobile phone, or other device that uses the display panel 10. The display panel 10 may include a screen body module 100 and a data driving circuit 200. The screen body module 100 is configured to implement pixel display. The data driving circuit 200 is electrically connected to the screen body module 100. The data driving circuit 200 is configured to store compensation data. The compensation data is configured to compensate for the Mura phenomenon of the screen body module 100. The NAND-Flash memory 20 is electrically connected to the display panel 10. The NAND-Flash memory 20 is configured to store operational data of the intelligent terminal 30. The NAND-Flash memory 20 is an apparatus of the intelligent terminal 30 itself.

In the present embodiment, the intelligent terminal 30 can store compensation data for compensation of the display panel 10. As for the transmission process of the compensation data of the display panel 10, a reference can be made to any one of the above methods for acquiring and transmitting the compensation data. The intelligent terminal 30 in the present embodiment may be configured to complete the storage of the compensation data of the display panel 10. In the present embodiment, the Flash memory in the display panel 10 is removed, to save the time of transmission and verification of the compensation data, save the space of the display panel, and reduce the process design difficulty of display panel 10. In the present embodiment, through storing the compensation data in the NAND-Flash memory 20, the compensation data may be called more efficiently and quickly to complete the data compensation for the display panel 10. In addition, the NAND-Flash memory 20 can permanently store the compensation data. The intelligent terminal 30, when being used for the first time, calls the compensation data stored in the NAND-Flash memory 20. The compensation data in the NAND-Flash memory 20 may be re-enabled when the intelligent terminal 30 is restarted or the compensation is needed again.

In a specific embodiment, the manufacturer prepares the display panel 10. The display panel 10 may include a screen body module 100 and a data driving circuit 200 electrically connected to the screen body module 100. In the process of compensating for the Mura phenomenon, the Mura compensation data may be generated through a computer.

In a specific embodiment, the step of generating the Mura compensation data through the computer may include the following steps.

The screen body module 100 is lighted up by the data driving circuit 200. The screen body module 100 displays gray-scale pictures of different orders. A CCD camera with high-resolution and high-precision is adopted to capture gray-scale pictures of different orders. According to the data collected by the CCD camera, the pixel color distribution characteristics are analyzed, and the Mura phenomenon is identified according to the relevant algorithm.

At least part of the steps in FIGS. 1-4 may include a plurality of sub-steps or phases, which are not necessary to be performed simultaneously, but may be performed at different time; and the sub-steps or phases may not necessarily performed sequentially, but may be performed by turns or alternately with other steps or sub-steps of other steps or at least part of the phases.

The computer uses the corresponding Mura compensation algorithm to generate Mura compensation data according to the identified Mura phenomenon. The Mura compensation data is loaded into the random access memory of the data driving circuit 200. The Mura data is compensated to the screen body module 100 through the data driving circuit 200, and it is observed whether the Mura phenomenon of the screen body module 100 or the display panel 10 has been eliminated. If not, different types of gray-scale pictures are re-taken and calculated to obtain compensation data. The compensation effect of the obtained compensation data continues to be confirmed. When the Mura phenomenon is eliminated after the compensation, the obtained compensation data is saved.

The screen body module 100 is encoded and an ID code is burned for distinguishing other screen body parts; the encoded screen body module is matched to the above confirmed compensation data having good compensation effect, and both the encoded screen body module and the compensation data are saved into the cloud server.

A variety of intelligent terminals 30 can be made by using the display panel 10. In the process of normal display of the intelligent terminal 30 implemented by using the display panel 10, it is required to acquire compensation data of the display panel 10. The step of acquiring the compensation data by the intelligent terminal 30 may include the following steps.

The intelligent terminal 30 (the screen body module 100 and the data driving circuit 200 are loaded into the intelligent terminal 30) is powered on, the kernel and the operating system are started, and the screen body module 100 is lighted up. The intelligent terminal 30 is connected to the Internet and logs in the cloud server of the screen body module 100. The intelligent terminal 30 automatically acquires the first identifier of the screen body module 100, and finds the corresponding compensation data according to the module ID. When the intelligent terminal 30 finds the corresponding compensation data, the compensation data is downloaded. If the download of the compensation data fails for three consecutive times, it is determined that the screen body module 100 is not produced by the original factory, and the downloading behavior is stopped.

After the intelligent terminal 30 successfully downloads the compensation data, the compensation data is saved into the NAND-Flash memory 20 of the intelligent terminal 30. If the intelligent terminal 30 successfully downloads the compensation data for the first time, there is no need to download it repeatedly.

Before the intelligent terminal 30 uses the compensation data, the intelligent terminal 30 first successfully downloads the compensation data and saves it locally (may be in the NAND-Flash memory 20). The intelligent terminal 30 may automatically read the compensation data from the NAND-Flash memory 20 every time the intelligent terminal is powered on and before the screen body module 100 is lighted up.

The intelligent terminal 30 verifies whether the compensation data is correct. If the compensation data is correct, the data driving circuit 200 calls the compensation data. The screen body module 100 displays the effect after the Mura compensation. If the compensation data verified by the intelligent terminal 30 is incorrect, the data driving circuit 200 does not call the compensation data, thereby ensuring the security of the compensation data used by the intelligent terminal 30.

Those of ordinary skill in the art will appreciate that all or part of the process for implementing the above-described exemplary embodiment methods may be accomplished by computer program instructing associated hardware. The computer program may be stored in a non-transitory computer readable storage medium, and may, when executed, include the flows of the embodiments of the methods described above. Any reference to the memory, storage, database or other media used in various embodiments provided in the present disclosure may include non-transitory and/or transitory memory. A non-transitory memory may include a read only memory (ROM), programmable ROM (PROM), an electrically programmable ROM (EPROM), an electrically erasable programmable ROM (EEPROM) or a flash memory. A volatile memory may include a random access memory (RAM) or an external cache memory. By way of illustration and not limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

Each technical feature of the above exemplary embodiments may be combined arbitrarily. To simplify the description, not all the possible combinations of the technical features in the above exemplary embodiments are described. However, all the combinations of these technical features should be considered as within the scope of the present disclosure, as long as such combinations do not contradict with each other.

The above exemplary embodiments merely illustrate several embodiments of the present disclosure, and the description thereof is specific and detailed, but it shall not be constructed as limiting the protection scope of the disclosure. It should be noted that, for a person of ordinary skill in the art, several variations and improvements may be made without departing from the concept of the disclosure, and these are all within the protection scope of the disclosure. Therefore, the protection scope of the disclosure shall be subject to the appended claims.

The invention claimed is:

1. A method for acquiring and transmitting compensation data, applied to implement acquisition and transmission of compensation data of a display panel, the display panel comprising: a screen body module, configured to implement pixel display; and a data driving circuit, electrically connected to the screen body module and configured to store the compensation data, the compensation data being configured to compensate a Mura phenomenon of the screen body module;

wherein, the method comprises:
respectively encoding the screen body module and the compensation data to obtain a first identifier corresponding to the screen body module and a second identifier corresponding to the compensation data, and the second identifier corresponding to the first identifier one to one;
identifying the first identifier of the screen body module;
acquiring the compensation data that has the corresponding second identifier according to the first identifier; and
storing the compensation data in the data driving circuit;
the method further comprises:
before the respectively encoding the screen body module and the compensation data,
lighting up the screen body module through the data driving circuit, and making the screen body module display gray-scale pictures of different orders;
acquiring image information of the screen body module under the gray-scale pictures of different orders; and
processing the image information through a Mura compensation algorithm to obtain the compensation data corresponding to the screen body module;
the method further comprises:
storing the encoded screen body module and the encoded compensation data into a cloud after the respectively encoding the screen body module and the compensation data;
wherein the storing the compensation data in the data driving circuit further comprises:
downloading the compensation data corresponding to the second identifier from the cloud; and
determining whether the compensation data corresponding to the second identifier is successfully downloaded;
wherein the determining whether the compensation data corresponding to the second identifier is successfully downloaded comprises:
generating a first check code of the compensation data in a process of uploading to the cloud, and generating a second check code in a process of writing the compensation data into a Nand-Flash memory;
comparing the first check code to the second check code to determine that the compensation data with the second identifier is downloaded correctly if the first check code is consistent with the second check code.

2. The method for acquiring and transmitting compensation data according to claim 1, further comprising:
after the obtaining the compensation data corresponding to the screen body module,
loading the compensation data into the data driving circuit, performing data compensation for the screen body module by the data driving circuit according to the loaded compensation data, if the Mura phenomenon of the screen body module is not eliminated, returning to the step of acquiring the image information of the screen body module under the gray-scale pictures of different orders.

3. The method for acquiring and transmitting compensation data according to claim 1, wherein the data driving circuit is further electrically connected to a Nand-Flash memory, and the determining whether the compensation data corresponding to the second identifier is successfully downloaded further comprises:

if the download is successful, storing the compensation data corresponding to the second identifier into the Nand-Flash memory.

4. The method for acquiring and transmitting compensation data according to claim 3, wherein the determining whether the compensation data corresponding to the second identifier is successfully downloaded further comprises:
if the download is not successful, returning to the step of downloading the compensation data corresponding to the second identifier from the cloud.

5. The method for acquiring and transmitting compensation data according to claim 4, wherein
if the step of downloading the compensation data corresponding to the second identifier from the cloud is performed more than three times, stopping the download.

6. The method for acquiring and transmitting compensation data according to claim 3, wherein the storing the compensation data in the data driving circuit further comprises:
initializing the screen body module; and
loading the compensation data corresponding to the second identifier stored in the Nand-Flash memory to the data driving circuit, and verifying whether the compensation data corresponding to the second identifier is loaded correctly.

7. The method for acquiring and transmitting compensation data according to claim 6, wherein the verifying whether the compensation data corresponding to the second identifier is loaded correctly further comprises:
if the compensation data corresponding to the second identifier if loaded correctly, the data driving circuit starts a Mura compensation mode and performs the data compensation for the display panel.

8. The method for acquiring and transmitting compensation data according to claim 7, wherein the verifying whether the compensation data corresponding to the second identifier is loaded correctly further comprises:
if the compensation data corresponding to the second identifier is loaded incorrectly, returning to the step of loading the compensation data corresponding to the second identifier stored in the Nand-Flash memory to the data driving circuit, and verifying whether the compensation data corresponding to the second identifier is loaded correctly.

9. The method for acquiring and transmitting compensation data according to claim 8, wherein the verifying whether the compensation data corresponding to the second identifier is loaded correctly further comprises:
if a number of incorrect loading of the compensation data corresponding to the second identifier is more than three times, the data driving circuit does not start the Mura compensation mode, and the display panel directly performs display without data compensation.

10. An intelligent terminal, comprising:
a display panel, comprising: a screen body module, configured to implement pixel display; and a data driving circuit, electrically connected to the screen body module and configured to store compensation data, the compensation data being configured to compensate a Mura phenomenon of the screen body module; and
a Nand-Flash memory, electrically connected to the display panel and configured to store operational data of the intelligent terminal;
wherein the data driving circuit is further configured to: light up the screen body module, make the screen body module display gray-scale pictures of different orders, acquire image information of the screen body module under the gray-scale pictures of different orders, and process the image information through a Mura compensation algorithm to obtain the compensation data corresponding to the screen body module;
wherein the encoded screen body module and the encoded compensation data are stored into a cloud after the respectively encoding the screen body module and the compensation data;
wherein the data driving circuit is further configured to: download the compensation data corresponding to the second identifier from the cloud; and determine whether the compensation data corresponding to the second identifier is successfully downloaded;
wherein the determining whether the compensation data corresponding to the second identifier is successfully downloaded comprises:
generating a first check code of the compensation data in a process of uploading to the cloud, and generating a second check code in a process of writing the compensation data into a NAND-Flash memory;
comparing the first check code to the second check code to determine that the compensation data with the second identifier is downloaded correctly if the first check code is consistent with the second check code.

* * * * *